(12) United States Patent
Lee et al.

(10) Patent No.: US 9,817,845 B2
(45) Date of Patent: Nov. 14, 2017

(54) THREE-DIMENSIONAL IMAGE FILE SEARCHING METHOD AND THREE-DIMENSIONAL IMAGE FILE SEARCHING SYSTEM

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Yi-Hsun Lee, New Taipei (TW); Meng-Gung Li, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 456 days.

(21) Appl. No.: 14/219,006

(22) Filed: Mar. 19, 2014

(65) Prior Publication Data

US 2015/0169723 A1 Jun. 18, 2015

(30) Foreign Application Priority Data

Dec. 12, 2013 (TW) .............................. 102145930 A

(51) Int. Cl.
*G06F 17/30* (2006.01)
(52) U.S. Cl.
CPC .............................. *G06F 17/30247* (2013.01)
(58) Field of Classification Search
CPC ................................................. G06F 17/30247
See application file for complete search history.

(56) References Cited

U.S. PATENT DOCUMENTS 5,647,058 A * 7/1997 Agrawal ........... G06F 17/30017
5,901,244 A * 5/1999 Souma ................. G06K 9/6232
382/118

(Continued)

FOREIGN PATENT DOCUMENTS

| CN | 101719140 | 6/2010 | |
|---|---|---|---|
| JP | 2006350724 | 12/2006 | |
| TW | 201042477 | 12/2010 | |
| WO | WO 2012061945 A1 * | 5/2012 | ....... G06F 17/30247 |
| WO | 2012176317 | 12/2012 | |

OTHER PUBLICATIONS

Yao Liu, "Study of Typical Three-dimensional Ground Target Recognition Based on Laser Radar", Chinese Master's These Full-text Database, Information Science and Technology, vol. 7, Jul. 15, 2012, pp. 1-10.

(Continued)

*Primary Examiner* — Grace Park
*Assistant Examiner* — Hubert Cheung
(74) *Attorney, Agent, or Firm* — JCIPRNET

(57) ABSTRACT

A three-dimensional image file searching method and a three-dimensional image file searching system are provided, and the three-dimensional image file searching method includes the following steps. A three-dimensional query image file is received. The three-dimensional query image file is converted to generate a first image group including a plurality of two-dimensional image files. The first image group is compared with a plurality of second image groups corresponding to a plurality of three-dimensional candidate image files respectively in a database, so as to obtain a search result conforming to the three-dimensional query image file.

8 Claims, 4 Drawing Sheets

(56) References Cited

U.S. PATENT DOCUMENTS

| | | | |
|---|---|---|---|
| 6,382,510 B1* | 5/2002 | Ni | G01N 21/8851 |
| | | | 235/462.05 |
| 2004/0181552 A1* | 9/2004 | Milne | G06K 9/00221 |
| 2007/0152037 A1* | 7/2007 | Chen | G06K 9/00281 |
| | | | 235/380 |
| 2007/0172131 A1* | 7/2007 | Chosokabe | G06F 17/30743 |
| | | | 382/224 |
| 2008/0037843 A1* | 2/2008 | Fu | G06T 15/08 |
| | | | 382/128 |
| 2008/0143751 A1* | 6/2008 | Chosokabe | G06F 17/30743 |
| | | | 345/654 |
| 2010/0239152 A1* | 9/2010 | Furst | G06K 9/00208 |
| | | | 382/132 |
| 2014/0149872 A1* | 5/2014 | Komori | H04M 1/7253 |
| | | | 715/736 |
| 2015/0178321 A1* | 6/2015 | Rivlin | G06F 17/30277 |
| | | | 707/728 |
| 2016/0171744 A1* | 6/2016 | Rhoads | G06K 9/00208 |
| | | | 345/419 |
| 2016/0232678 A1* | 8/2016 | Kurz | G06F 17/30247 |

OTHER PUBLICATIONS

Mien Mao, "3-D Pen Gesture Recognition Methods in Virtual Reality of 3-D Sketch Designing Environment", Chinese Master's These Full-text Database, Information Science and Technology, vol. 11, Nov. 15, 2013, pp. 1-67.

\* cited by examiner

THREE-DIMENSIONAL IMAGE FILE SEARCHING METHOD AND THREE-DIMENSIONAL IMAGE FILE SEARCHING SYSTEM

CROSS-REFERENCE TO RELATED APPLICATION

This application claims the priority benefit of Taiwan application serial no. 102145930, filed on Dec. 12, 2013. The entirety of the above-mentioned patent application is hereby incorporated by reference herein and made a part of this specification.

BACKGROUND

Technical Field

The technical field relates to an image searching system, and in particular relates to a three-dimensional image file searching method and a three-dimensional image file searching system for searching a three-dimensional image file.

Description of Related Art

In the era of information explosion, a variety of data and information is shared through different databases and cloud platforms, thus facilitating the flow of information. To allow the user to quickly find the required information, various search engines have been developed. For example, the user can type in a keyword in the search bar for the search engine to find information relevant to the keyword. Besides, there are many search engines that also support search of data in image formats and provide the user more diverse search methods.

Take the similar image search function developed by Google search engine as an example, after the user uploads an image, as the search condition, to the search engine, the search engine can not only find web contents relating to this image but also list web pages currently using this image. In addition, the Google search engine can find similar pictures that have similar styles, colors, or patterns.

For a three-dimensional image file, however, the image data contained therein is very large and complex. Thus, the search method that directly compares three-dimensional image files involves large and sophisticated calculations. That is to say, in order to obtain an accurate comparison result of three-dimensional image files, the search method of directly comparing three-dimensional image files needs to be based on highly complex hardware and high-speed operation, such that the search result can more accurately meet the user's requirement. Therefore, how to carry out search for three-dimensional image files while reducing the calculation complexity and operation time becomes a concern of persons skilled in the art.

SUMMARY

In view of the above, one of the exemplary embodiments provides a three-dimensional image file searching method and a three-dimensional image file searching system capable of reducing operation complexity and search time for searching a three-dimensional image file.

One of exemplary embodiments provides a three-dimensional image file searching method including the following: receiving a three-dimensional query image file; converting the three-dimensional query image file to generate a first image group including a plurality of two-dimensional image files; comparing the first image group with a plurality of second image groups respectively corresponding to a plurality of three-dimensional candidate image files in a database; and obtaining a search result conforming to the three-dimensional query image file.

According to one exemplary embodiment, the step of converting the three-dimensional query image file to generate the first image group including the two-dimensional image files comprises: obtaining the two-dimensional image files of the three-dimensional query image file according to a plurality of preset view angles, wherein the two-dimensional image files correspond to different preset view angles respectively.

According to one exemplary embodiment, the three-dimensional image file searching method further includes the following: storing the three-dimensional candidate image files in the database; converting each of the three-dimensional candidate image files to generate a plurality of two-dimensional candidate image files corresponding to each of the three-dimensional candidate image files; and building up the second image groups corresponding to each of the three-dimensional candidate image files in the database, wherein each of the second image groups includes the two-dimensional candidate image files corresponding to each of the three-dimensional candidate image files.

According to one exemplary embodiment, the two-dimensional image files at least include a first two-dimensional image file and a second two-dimensional image file, and the step of comparing the first image group with the second image groups respectively corresponding to the three-dimensional candidate image files in the database includes the following: sequentially performing a similarity comparison procedure on the first two-dimensional image file and the two-dimensional candidate image files of the second image groups; and sequentially performing the similarity comparison procedure on the second two-dimensional image file and the two-dimensional candidate image files of the second image groups.

According to one exemplary embodiment, the step of comparing the first image group with the second image groups respectively corresponding to the three-dimensional candidate image files in the database includes: calculating image characteristic values of the two-dimensional image files to obtain a first group characteristic value of the first image group based on the image characteristic values of the two-dimensional image files; calculating image characteristic values of the two-dimensional candidate image files to obtain a plurality of second group characteristic values corresponding to the second image groups based on the image characteristic values of the two-dimensional candidate image files; and sequentially comparing the first group characteristic value with the second group characteristic values.

According to one exemplary embodiment, the step of obtaining the search result conforming to the three-dimensional query image file includes: obtaining a plurality of comparison results in association with the three-dimensional candidate image files; and marking the three-dimensional candidate image files as a target image file or a non-target image file respectively according to the comparison results, wherein the three-dimensional candidate image file marked as the target image file is the search result conforming to the three-dimensional query image file.

One of exemplary embodiments provides a three-dimensional image file searching system, including an image file storage unit and an image file searching unit. The image file storage unit has a database. The image file searching unit is connected to the image file storage unit and includes an image file receiving module, a conversion module, a comparison module, and a result module. The image file receiving module receives a three-dimensional query image file. The conversion module converts the three-dimensional query image file to generate a first image group including a plurality of two-dimensional image files. The comparison module compares the first image group respectively with a plurality of second image groups corresponding to a plurality of three-dimensional candidate image files in the database. The result module obtains a search result conforming to the three-dimensional query image file.

According to one exemplary embodiment, the conversion module obtains the two-dimensional image files of the three-dimensional query image file according to a plurality of preset view angles, wherein the two-dimensional image files respectively correspond to different preset view angles.

According to one exemplary embodiment, the image file storage unit further includes a database generation module. The database generation module is coupled to the database. The database generation module stores the three-dimensional candidate image files in the database, and converts each of the three-dimensional candidate image files to generate a plurality of two-dimensional candidate image files corresponding to each of the three-dimensional candidate image files. The database generation module builds up the second image groups corresponding to each of the three-dimensional candidate image files in the database, wherein each of the second image groups includes the two-dimensional candidate image files corresponding to each of the three-dimensional candidate image files.

According to one exemplary embodiment, the comparison module sequentially performs a similarity comparison procedure on a first two-dimensional image file and the two-dimensional candidate image files of the second image groups, and sequentially performs the similarity comparison procedure on a second two-dimensional image file and the two-dimensional candidate image files of the second image groups.

According to one exemplary embodiment, the comparison module calculates image characteristic values of the two-dimensional image values to obtain a first group characteristic value of the first image group based on the image characteristic values of the two-dimensional image files. The comparison module calculates image characteristic values of the two-dimensional candidate image values to obtain a plurality of second group characteristic values corresponding to the second image groups based on the image characteristic values of the two-dimensional candidate image files, and sequentially compares the first group characteristic value with the second group characteristic values.

According to one exemplary embodiment, the result module obtains a plurality of comparison results in association with the three-dimensional candidate image files. The result module marks the three-dimensional candidate image files as a target image file or a non-target image file respectively according to the comparison results, wherein the three-dimensional candidate image file marked as the target image file is the search result conforming to the three-dimensional query image file.

Based on the above, in the exemplary embodiments, the three-dimensional query image file in the three-dimensional format is converted into multiple two-dimensional image files in the two-dimensional format, which are compared with multiple two-dimensional image files corresponding to each three-dimensional candidate image file in the database, thereby obtaining the search result conforming to the three-dimensional query image file. Accordingly, direct use of the three-dimensional query image file of a large data amount as the search condition is avoided to reduce the complexity and data operation amount of search for three-dimensional image files based on three-dimensional image files.

To make the aforementioned and other features and advantages of the disclosure more comprehensible, several embodiments accompanied with drawings are described in detail as follows.

BRIEF DESCRIPTION OF THE DRAWINGS

The accompanying drawings are included to provide a further understanding of the exemplary embodiments, and are incorporated in and constitute a part of this specification. The drawings illustrate exemplary embodiments and, together with the description, serve to explain the principles of exemplary embodiments.

DESCRIPTION OF THE EMBODIMENTS

Figure 1:
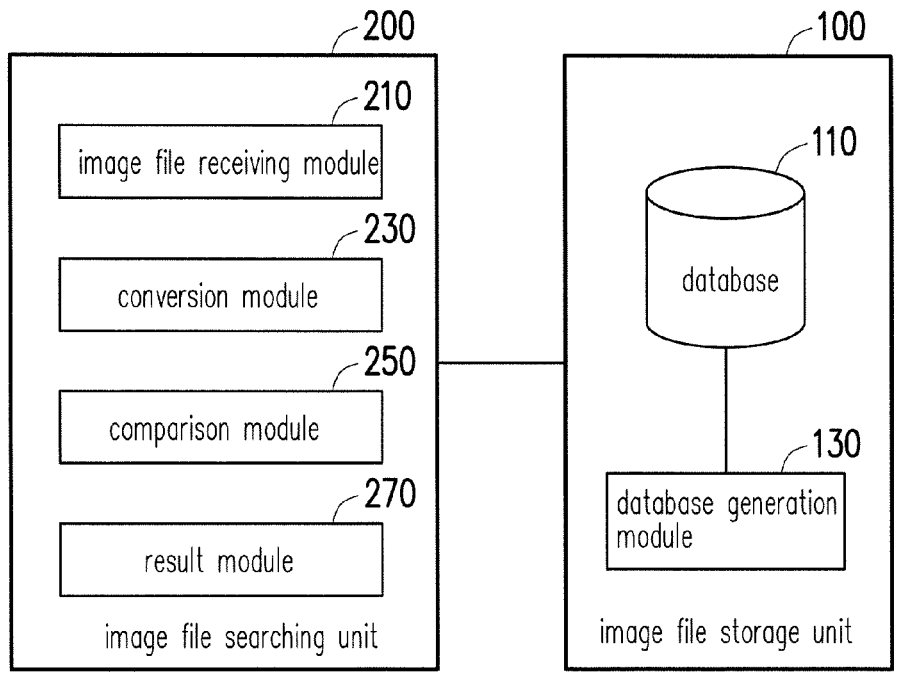
FIG. 1 is a block diagram illustrating a three-dimensional image file searching system according to an exemplary embodiment.

FIG. 1 is a block diagram illustrating a three-dimensional image file searching system according to an embodiment of the exemplary embodiment. With reference to FIG. 1, a three-dimensional image file searching system 10 includes an image file storage unit 100 and an image file searching unit 200, wherein the image file searching unit 200 is connected with the image file storage unit 100. It should be noted that, in an embodiment, the image file searching unit 200 and the image file storage unit 100 are subordinate to the same electronic device, which may be a search server for example, and the image file searching unit 200 is connected with the image file storage unit 100 through an internal data bus.

In another embodiment, the image file searching unit 200 and the image file storage unit 100 may be subordinate to different electronic devices, and the image file searching unit 200 may be connected with the image file storage unit 100 through a network. In a word, the image file storage unit 100 may be a host of a local network, a host database of a search engine, or a cloud database, etc. The image file searching unit 200 may be a personal host, a system server in a local network, a host of a search engine, or a cloud operation system, etc. However, the disclosure is not limited to the above.

The image file storage unit 100 includes a database 110 and a database generation module 130. The database generation module 130 is configured for building up data in the database 110. The database 110 is stored in a storage medium of the image file storage unit 100. The storage medium may be a fixed or movable random access memory (RAM) of any type, a read-only memory (ROM), a flash memory, a hard disc, other similar device, or a combination of these devices.

The image file searching unit 200 includes an image file receiving module 210, a conversion module 230, a comparison module 250, and a result module 270. These modules are configured for executing a search function of searching three-dimensional image files based on a three-dimensional image file. The database generation module 130, the image file receiving module 210, the conversion module 230, the comparison module 250, and the result module 270 may be implemented by software, hardware, or a combination of the foregoing. However, the disclosure is not limited thereto. The software may be a source code, an operating system, application software, or a driving program, etc., for example, stored in the storage medium. The hardware may be a central processing unit (CPU) or a programmable microprocessor for general use or special use.

Figure 2:
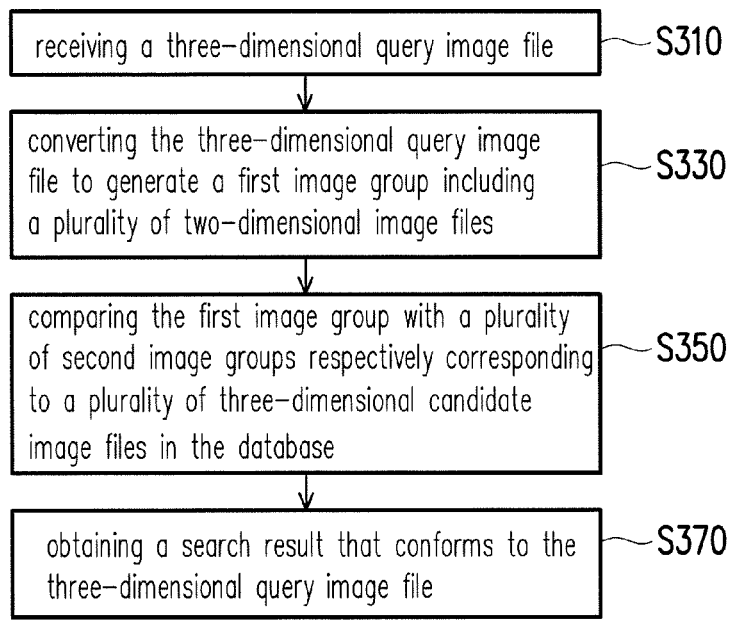
FIG. 2 is a flowchart illustrating a three-dimensional image file searching method according to an exemplary embodiment.

FIG. 2 is a flowchart illustrating a three-dimensional image file searching method according to an exemplary embodiment. The method of this embodiment is adapted for the three-dimensional image file searching system 10 of FIG. 1. Steps of the method of this embodiment are explained in detail hereinafter with reference to the modules of the three-dimensional image file searching system 10.

First, in Step S310, the image file receiving module 210 receives a three-dimensional image file in a three-dimensional format. According to the design requirement of the actual product, the file format of the three-dimensional image file may be any format, such as 3DS, DWF, 3D, DWG, DXF, IGES, STL, etc. However, it should be noted that the disclosure is not limited thereto. In Step S330, the conversion module 230 converts a three-dimensional query image file to generate a first image group including a plurality of two-dimensional image files, wherein the two-dimensional image files are in a two-dimensional format.

To be more specific, the three-dimensional query image file is a picture used for displaying a three-dimensional space. Thus, corresponding two-dimensional image files are obtained according to different view angles. The file format of the two-dimensional image files may be any two-dimensional format, such as JPG, GIF, JEPG, or BMP, etc. However, it is noted that the disclosure is not limited to the above. In other words, according to different view angles, the conversion module 230 obtains side views or aerial views, etc., of the three-dimensional query image file. Therefore, in an embodiment, the conversion module 230 obtains a plurality of two-dimensional image files of the three-dimensional query image file according to a plurality of preset view angles and identifies these two-dimensional image files as the first image group, wherein each of the two-dimensional image files corresponds to one of the preset view angles.

Figure 3A:
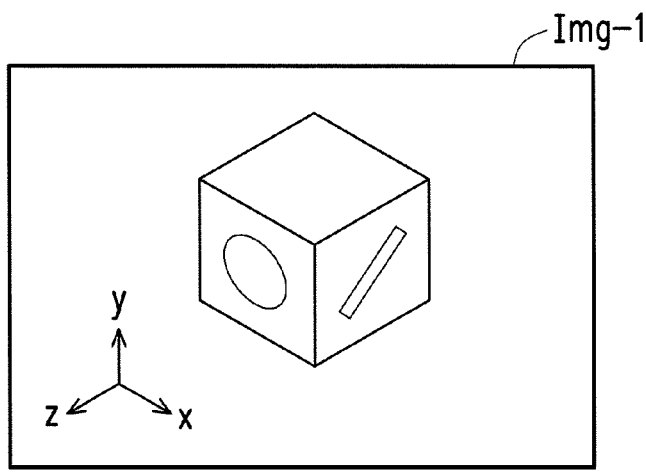
FIG. 3A to FIG. 3C are schematic diagrams illustrating examples of converting a three-dimensional query image file according to an exemplary embodiment.
Figure 3B:
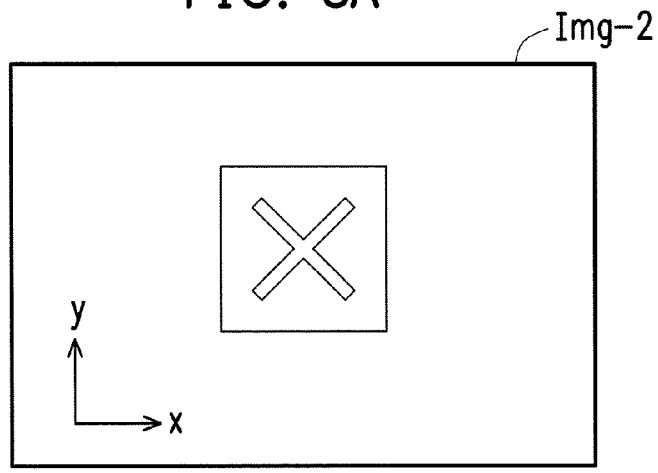
Figure 3C:
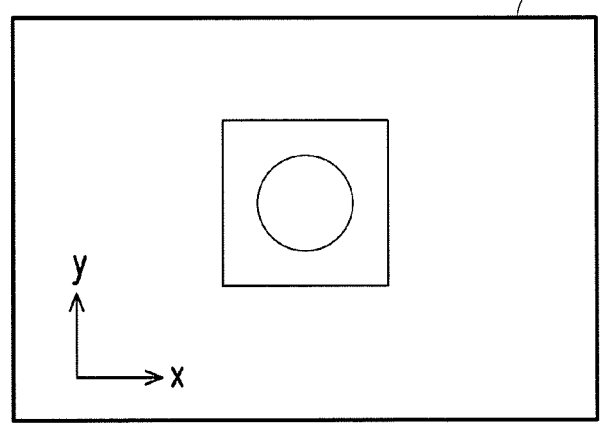

For instance, FIG. 3A to FIG. 3C are schematic diagrams illustrating examples of converting the three-dimensional query image file according to an exemplary embodiment. With reference to FIG. 3A to FIG. 3C, a three-dimensional query image file Img-1 is a picture used for displaying a three-dimensional space. Thus, reference coordinates of the three-dimensional query image file Img-1 are in an x-axis direction, a y-axis direction, and a z-axis direction. When the preset view angle is from a positive side of the z-axis direction, the conversion module 230 obtains a two-dimensional image file Img-2 (as shown in FIG. 3B). Because the two-dimensional image file Img-2 is an image of two-dimensional format, reference coordinates of the two-dimensional image file Img-2 include are in the x-axis direction and the y-axis direction. Likewise, when the preset view angle is from a negative side of the z-axis direction, the conversion module 230 obtains a two-dimensional image file Img-3 (as shown in FIG. 3C). Accordingly, in this example, the first image group that the conversion module 230 obtains in association with the three-dimensional query image file Img-1 includes the two-dimensional image file Img-2 and the two-dimensional image file Img-3. However, it should be noted that the examples illustrated in FIG. 3A to FIG. 3C are merely exemplary embodiments and are not intended to limit the disclosure.

Next, in Step S350, the comparison module 250 compares the first image group with a plurality of second image groups respectively corresponding to a plurality of three-dimensional candidate image files in the database 110. In Step S370, the result module 270 obtains a search result that conforms to the three-dimensional query image file which serves as a search condition. More specifically, the database 110 of the image file storage unit 100 stores a plurality of three-dimensional candidate image files and the respective second image groups thereof. The comparison module 250 takes the first image group of the three-dimensional query image file as a comparison condition and respectively compares the first image group of the three-dimensional query image file with the multiple second image groups in the database 110. Accordingly, the result module 270 finds image files similar to the three-dimensional query image file from the multiple three-dimensional candidate image files according to a comparison result generated in Step S350.

For example, after the comparison module 250 executes a comparison procedure, the result module 270 obtains a plurality of comparison results in association with the three-dimensional candidate image files, and the comparison results are for example similarities generated by a similarity comparison procedure. Then, the result module 270 marks the three-dimensional candidate image files as a target image file or non-target image file respectively according to the comparison results. The three-dimensional candidate image files marked as the target image files are search results conforming to the three-dimensional query image file. Simply put, the three-dimensional candidate image files marked as the target image files are three-dimensional image files similar to the three-dimensional query image file.

In addition, in one of the exemplary embodiments of the disclosure, the three-dimensional image file searching method includes the following two basic concepts, wherein the first one is a step of setting up the database and the second one is a step of searching for similar three-dimensional image files. The embodiment of FIG. 2 specifies the search and comparison steps of the disclosure. Thus, another embodiment is given below to explain in detail the step of setting up the database.

Figure 4:
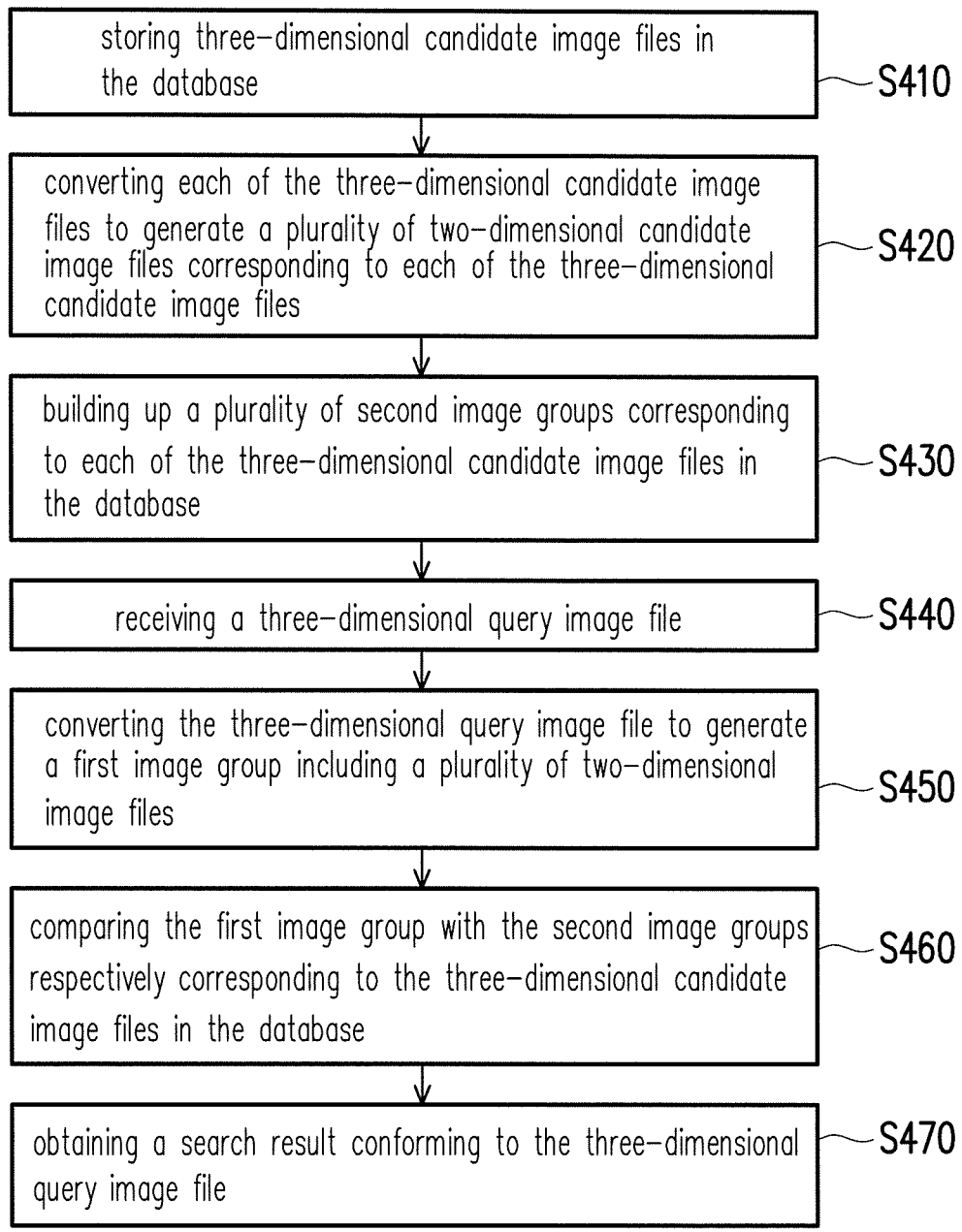
FIG. 4 is a flowchart illustrating a three-dimensional image file searching method according to another exemplary embodiment.
Figure 5:
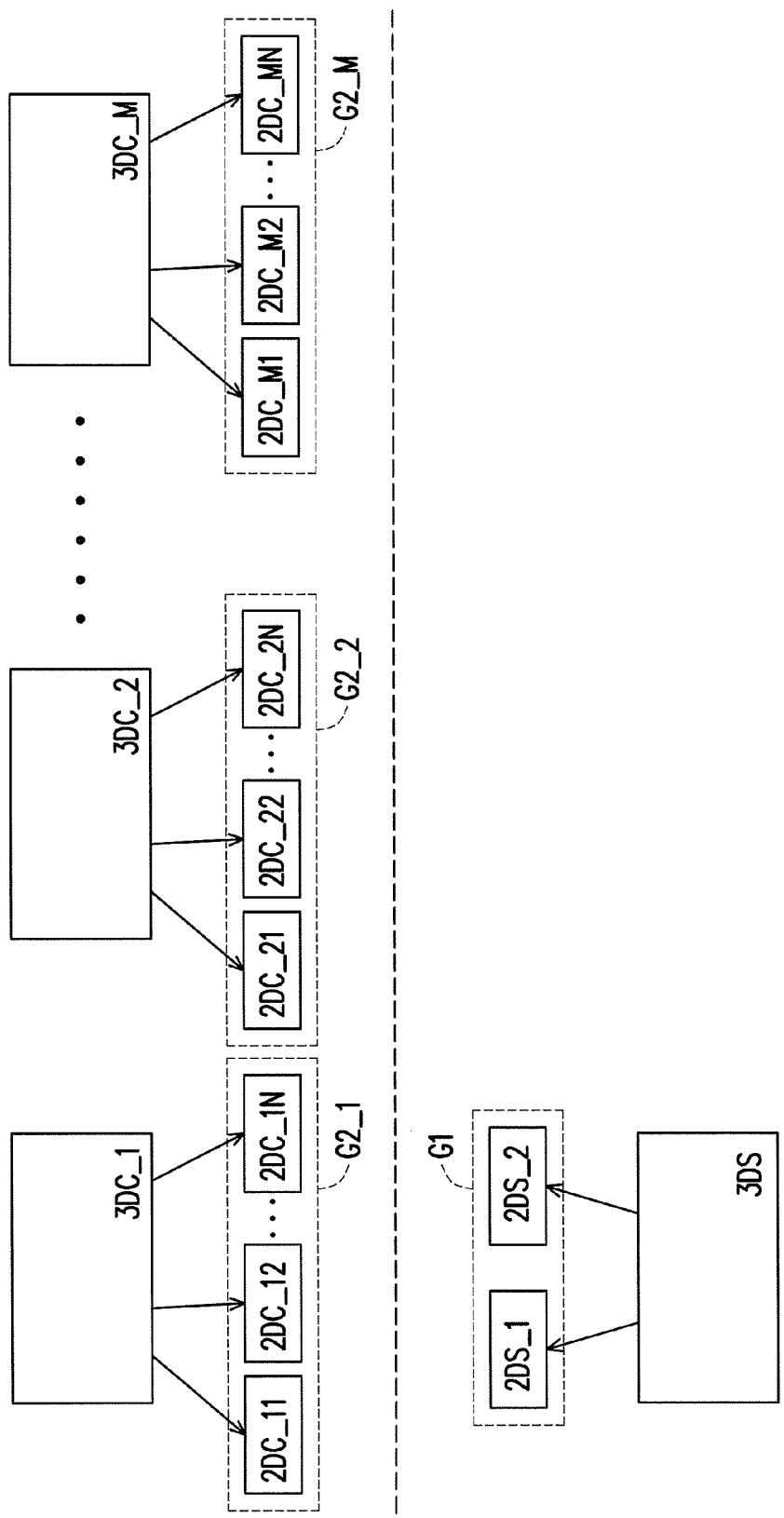
FIG. 5 is a schematic diagram illustrating a three-dimensional image file searching method according to yet another exemplary embodiment.

FIG. 4 is a flowchart illustrating a three-dimensional image file searching method according to an exemplary embodiment. The method of this embodiment is adapted for the three-dimensional image file searching system 10 of FIG. 1. Steps of the method of this embodiment are explained in detail hereinafter with reference to the modules of the three-dimensional image file searching system 10. Moreover, in order to clearly explain the exemplary embodiment, FIG. 5 is a schematic diagram illustrating a three-dimensional image file searching method according to another exemplary embodiment. Please refer to FIG. 1, FIG. 4, and FIG. 5.

First, in Step S410, the database generation module 130 stores three-dimensional candidate image files 3DC_1~3DC_M in the database 110, wherein M is an integer greater than 1. In Step S420, the database generation module 130 converts each of the three-dimensional candidate image files 3DC_1~3DC_M to generate a plurality of two-dimensional candidate image files 2DC_11~2DC_1N, 2DC_21~2DC_2N, . . . , 2DC_M1~2DC_MN respectively corresponding to each of the three-dimensional candidate image files 3DC_1~3DC_M. In Step S430, the database generation module 130 builds up second image groups G2_1~G2_M corresponding to each of the three-dimensional candidate image files 3DC_1~3DC_M in the database 110, wherein each of the second image groups G2_1~G2_M has a plurality of two-dimensional candidate image files 2DC_11~2DC_1N, 2DC_21~2DC_2N, 2DC_M1~2DC_MN respectively corresponding to each of the three-dimensional candidate image files 3DC_1~3DC_M.

As shown in FIG. 5, the database generation module 130 converts the three-dimensional candidate image file 3DC_1 to N two-dimensional candidate image files 2DC_11·2DC_1N, and N is an integer greater than 1. The two-dimensional candidate image files 2DC_11~2DC_1N belong to the same second image group G2_1. Likewise, the database generation module 130 converts the three-dimensional candidate image file 3DC_2 to N two-dimensional candidate image files 2DC_21~2DC_2N, and the two-dimensional candidate image files 2DC_21~2DC_2N belong to the same second image group G2_2. Similarly, the database generation module 130 further converts the three-dimensional candidate image file 3DC_M to N two-dimensional candidate image files 2DC_M1~2DC_MN, and the two-dimensional candidate image files 2DC_M1~2DC_MN all belong to the second image group G2_M. It should be noted that the three-dimensional candidate image files 3DC_1~3DC_M in this exemplary embodiment are converted to generate two-dimensional candidate image files of the same number (i.e. N); however, the disclosure is not limited thereto. In another embodiment, the three-dimensional candidate image files may be converted to generate two-dimensional candidate image files of different numbers.

That is to say, in a setup procedure of the database, in addition to storing all the three-dimensional candidate image files in the database 110 in the storage medium, an operation of converting the image file format is further executed on each three-dimensional candidate image file, and the obtained corresponding two-dimensional candidate image files are stored in the database 110. Moreover, the multiple two-dimensional candidate image files that correspond to the same three-dimensional candidate image file are identified as the same second image group. A method of identifying the second image group includes, for example, assigning the same index number to the two-dimensional candidate image files that belong to the same second image group, so as to divide the two-dimensional candidate image files into different second image groups. A step of converting the three-dimensional candidate image file to generate the multiple two-dimensional candidate image files is similar to the aforementioned step of converting the three-dimensional query image file to generate the multiple two-dimensional image files, and thus will not be repeated here.

Then, in Step S440, the image file receiving module 210 receives a three-dimensional query image file 3DS of a three-dimensional format. In Step S450, the conversion module 230 converts the three-dimensional query image file 3DS to generate a first image group G1 including a plurality of two-dimensional image files 2DS_1 and 2DS_2, wherein the two-dimensional image files 2DS_1 and 2DS_2 are in a two-dimensional format. Thereafter, in Step S460, the comparison module 250 compares the first image group G1 with a plurality of second image groups G2_1~G2_M respectively corresponding to a plurality of three-dimensional candidate image files 3DC_1~3DC_M in the database 110. At last, in Step S470, the result module 270 obtains a search result conforming to the three-dimensional query image file 3DS that serves as the search condition.

It should be noted that, in an embodiment, the comparison module 250 may perform a similarity comparison procedure on a first two-dimensional image file 2DS_1 and all the two-dimensional candidate image files 2DC_11~2DC_1N, 2DC_21~2DC_2N, . . . , 2DC_M1~2DC_MN in the second image groups G2_1~G2_M. In addition, the comparison module 250 further performs the similarity comparison procedure on a second two-dimensional image file 2DS_2 and the two-dimensional candidate image files 2DC_11~2DC_1N, 2DC_21~2DC_2N, . . . , 2DC_M1~2DC_MN in part of or all of the second image groups G2_1~G2_M in sequence.

To be more specific, after using the first two-dimensional image file 2DS_1 for comparison, the comparison module 250 first sieves out the second image group with the two-dimensional candidate image file whose similarity with respect to the first two-dimensional image file 2DS_1 is greater than a threshold value. For example, assuming that the comparison module 250 determines that the similarity between the two-dimensional candidate image file 2DC_22 and the first two-dimensional image file 2DS_1 is greater than the threshold value, the comparison module 250 then sieves out the second image group G2_2 and performs the similarity comparison procedure on the second two-dimensional image file 2DS_2 and the two-dimensional candidate image files 2DC_21~2DC_2N of the second image group G2_2.

Accordingly, if the similarity between the second two-dimensional image file 2DS_2 and another two-dimensional candidate image file of the second image group G2_2 is greater than the threshold value, the three-dimensional candidate image file 3DC_2 corresponding to the second image group G2_2 can be deemed as one of the search results conforming to the three-dimensional query image file 3DS. Simply put, as long as any second image group includes two two-dimensional candidate image files similar to the first two-dimensional image file 2DS_1 and the first two-dimensional image file 2DS_1, the three-dimensional candidate image file corresponding to such a second image group can be deemed as one of the search results conforming to the three-dimensional query image file 3DS.

As to the similarity comparison procedure of two-dimensional image files, a graphic similarity comparison algorithm, such as HSV Histogram, consitional random field, maximum entropy markov model, etc., may be used. For example, if HSV Histogram analysis method is used, a difference of HSV Histogram between the first two-dimensional image file 2DS_1 and each of two-dimensional candidate image files 2DC_11~2DC_1N, 2DC_21~2DC_2N, . . . , 2DC_M1~2DC_MN may be used to determine the similarity therebetween. Since those skilled in the art should be familiar with the use of HSV Histogram, details thereof will be omitted here. Furthermore, in the disclosure, the similarity is not necessarily determined by using the HSV Histogram analysis method. In another embodiment, the comparison module 250 may use other methods for similarity comparison, such as pixel gradient or edge detection.

Nevertheless, the comparison method based on two-dimensional image files in the disclosure is not limited to the aforementioned method of comparing single image file. In an embodiment, the comparison module 250 performs similarity comparison based on a group characteristic value. More specifically, the comparison module 250 first calculates image characteristic values of the two-dimensional image files 2DS_1 and 2DS_2 and obtains a first group characteristic value of the first image group G1 based on the image characteristic values of the two-dimensional image files 2DS_1 and 2DS_2. For example, the comparison module 250 may respectively calculate color information of the two-dimensional image files 2DS_1 and 2DS_2 and convert the color information of the two-dimensional image files 2DS_1 and 2DS_2 into the first group characteristic value of the first image group G1.

Likewise, the comparison module 250 calculates image characteristic values of the respective two-dimensional candidate image files 2DC_11~2DC_1N, 2DC_21~2DC_2N, . . . , 2DC_M1~2DC_MN and converts the image characteristic values of the two-dimensional candidate image files 2DC_11~2DC_1N, 2DC_21~2DC_2N, . . . , 2DC_M1~2DC_MN to a plurality of second group characteristic values corresponding to the second image groups G2_1~G2_M. Accordingly, the comparison module 250 obtains the second group characteristic values representing the second image groups. Based on the above, the comparison module 250 sequentially compares the first group characteristic value with the second group characteristic values to generate a plurality of comparison results, and thereby the result module 270 sieves out the three-dimensional candidate image file similar to the three-dimensional query image file 3DS.

To sum up, in the exemplary embodiments of the disclosure, the three-dimensional query image file is converted into multiple two-dimensional image files, which are grouped as the first image group to be compared with the second image groups representing different three-dimensional candidate image files in the database, thereby obtaining the three-dimensional candidate image file similar to the three-dimensional query image file. Because less operation resources and search time are required for directly comparing two-dimensional image files, the complexity and data operation amount are reduced for searching three-dimensional image files based on three-dimensional image files, and the search for three-dimensional image files based on three-dimensional image files is simplified and the accuracy of the search result is also improved.

It will be apparent to those skilled in the art that various modifications and variations can be made to the disclosed embodiments without departing from the scope or spirit of the disclosure. In view of the foregoing, it is intended that the disclosure covers modifications and variations of this disclosure provided that they fall within the scope of the following claims and their equivalents.

What is claimed is:
1. A three-dimensional image file searching method, comprising:
  storing a plurality of three-dimensional candidate image files in a database;
  converting each of the three-dimensional candidate image files to generate a plurality of two-dimensional candidate image files corresponding to each of the three-dimensional candidate image files;
  building up a plurality of second image groups corresponding to each of the three-dimensional candidate image files in the database, wherein each of the second image groups comprises the two-dimensional candidate image files corresponding to each of the three-dimensional candidate image files;
  receiving a three-dimensional query image file;
  converting the three-dimensional query image file to generate a first image group comprising a plurality of two-dimensional image files;
  comparing the two-dimensional image files respectively corresponding to one of the preset view angles in the first image group with the two-dimensional candidate image files in the second image groups respectively corresponding to the three-dimensional candidate image files in the database; and
  obtaining a search result conforming to the three-dimensional query image file,
  wherein the two-dimensional image files at least comprise a first two-dimensional image file and a second two-dimensional image file, and the step of comparing the two-dimensional image files respectively corresponding to one of the preset view angles in the first image group with the two-dimensional candidate image files in the second image groups respectively corresponding to the three-dimensional candidate image files in the database comprises:
    sequentially performing a similarity comparison procedure on the first two-dimensional image file with all the two-dimensional candidate image files of the second image groups to sieve the second image groups and to extract part of the second image groups; and then sequentially performing the similarity comparison procedure on the second two-dimensional image file with part of the two-dimensional candidate image files of the extracted part of the second image groups.

2. The three-dimensional image file searching method according to claim 1, wherein the step of converting the three-dimensional query image file to generate the first image group comprising the two-dimensional image files comprises:
  obtaining the two-dimensional image files of the three-dimensional query image file according to the preset view angles, wherein the two-dimensional image files correspond to different preset view angles respectively.

3. The three-dimensional image file searching method according to claim 1, wherein the step of comparing the two-dimensional image files respectively corresponding to one of the preset view angles in the first image group with the two-dimensional candidate image files in the second image groups respectively corresponding to the three-dimensional candidate image files in the database comprises:
  calculating image characteristic values of the two-dimensional image files to obtain a first group characteristic value of the first image group based on the image characteristic values of the two-dimensional image files;
  calculating image characteristic values of the two-dimensional candidate image files to obtain a plurality of second group characteristic values corresponding to the second image groups based on the image characteristic values of the two-dimensional candidate image files; and
  sequentially comparing the first group characteristic value with the second group characteristic values.

4. The three-dimensional image file searching method according to claim 1, wherein the step of obtaining the search result conforming to the three-dimensional query image file comprises:
  obtaining a plurality of comparison results in association with the three-dimensional candidate image files; and marking the three-dimensional candidate image files as a target image file or a non-target image file respectively according to the comparison results, wherein the one or multiple three-dimensional candidate image files marked as the target image file is the search result conforming to the three-dimensional query image file.

5. A three-dimensional image file searching system, comprising:
an image file storage unit comprising a database and comprising a first processor, wherein the first processor is configured for: converting each of a plurality of three-dimensional candidate image files to generate a plurality of two-dimensional candidate image files corresponding to each of the three-dimensional candidate image files, and building up a plurality of second image groups corresponding to each of the three-dimensional candidate image files in the database, wherein each of the second image groups comprises the two-dimensional candidate image files corresponding to each of the three-dimensional candidate image files; and
an image file searching unit connected to the image file storage unit and comprising:
a second processor, configured for
receiving a three-dimensional query image file;
converting the three-dimensional query image file to generate a first image group comprising a plurality of two-dimensional image files;
comparing the two-dimensional image files respectively corresponding to one of preset view angles in the first image group respectively with the two-dimensional candidate image files in the second image groups corresponding to the three-dimensional candidate image files in the database; and
obtaining a search result containing to the three-dimensional query image file,
wherein the second processor sequentially performs a similarity comparison procedure on a first two-dimensional image file with all the two-dimensional candidate image files of the second image groups to sieve the second image groups and to extract part of the second image groups, and sequentially performs the similarity comparison procedure on a second two-dimensional image file with part of the two-dimensional candidate image files of the extracted part of the second image groups.

6. The three-dimensional image file searching system according to claim 5, wherein the second processor obtains the two-dimensional image files of the three-dimensional query image file according to the preset view angles, wherein the two-dimensional image files respectively correspond to different preset view angles.

7. The three-dimensional image file searching system according to claim 5, wherein the second processor calculates image characteristic values of the two-dimensional image values to obtain a first group characteristic value of the first image group based on the image characteristic values of the two-dimensional image files, calculates image characteristic values of the two-dimensional candidate image values to obtain a plurality of second group characteristic values corresponding to the second image groups based on the image characteristic values of the two-dimensional candidate image files, and sequentially compares the first group characteristic value with the second group characteristic values.

8. The three-dimensional image file searching system according to claim 5, wherein the second processor obtains a plurality of comparison results in association with the three-dimensional candidate image files, and marks the three-dimensional candidate image files as a target image file or a non-target image file respectively according to the comparison results, wherein the one or multiple three-dimensional candidate image files marked as the target image file is the search result conforming to the three-dimensional query image file.

\* \* \* \* \*